United States Patent
Wik

(10) Patent No.: US 7,433,747 B2
(45) Date of Patent: Oct. 7, 2008

(54) METHOD FOR GENERATING PROCESS CHAINS

(75) Inventor: Juergen Wik, Locarno (CH)

(73) Assignee: MTU Aero Engines GmbH, Munich (DE)

( * ) Notice: Subject to any disclaimer, the term of this patent is extended or adjusted under 35 U.S.C. 154(b) by 279 days.

(21) Appl. No.: 11/488,323

(22) Filed: Jul. 18, 2006

(65) Prior Publication Data

US 2007/0033081 A1  Feb. 8, 2007

(51) Int. Cl.
*G06F 19/00* (2006.01)
(52) U.S. Cl. .......................................... 700/97; 700/103
(58) Field of Classification Search ........... 700/97–100, 700/103, 108, 116, 44, 28; 705/38, 7–8; 438/14
See application file for complete search history.

(56) References Cited

U.S. PATENT DOCUMENTS

| | | | |
|---|---|---|---|
| 5,103,421 A | 4/1992 | Ward et al. | 395/700 |
| 6,748,287 B1 * | 6/2004 | Hagen et al. | 700/99 |
| 7,013,189 B2 | 3/2006 | Weber | 700/97 |
| 7,082,338 B1 * | 7/2006 | Chen et al. | 700/31 |
| 7,174,233 B1 * | 2/2007 | Blackshear et al. | 700/109 |
| 7,218,980 B1 * | 5/2007 | Orshansky et al. | 700/99 |
| 7,305,351 B1 * | 12/2007 | Bechhofer et al. | 705/7 |
| 2003/0093762 A1 | 5/2003 | Rietman et al. | 716/2 |
| 2005/0071266 A1 | 3/2005 | Eder | 705/38 |
| 2005/0137919 A1 * | 6/2005 | Buckley et al. | 705/7 |

FOREIGN PATENT DOCUMENTS

| | | |
|---|---|---|
| DE | 100 29 086 | 1/2002 |
| EP | 0 992 869 | 4/2000 |

OTHER PUBLICATIONS

Implementation of Prefoem-LCM process chain for the manufucturing of Rotor Hub and Shat combination. www.ivw.uni-ki.de or www.aerodyn.de.*

* cited by examiner

*Primary Examiner*—Kidest Bahta
(74) *Attorney, Agent, or Firm*—Davidson, Davidson & Kappel, LLC

(57) ABSTRACT

A method for generating process chains for product manufacturing is provided. Accordance to this method, all available data pertaining to the component to be manufactured is collected and the component to be manufactured is subdivided into component elements which can be manufactured independently of one another. The method further includes collecting all possible core technologies for the individual process blocks, where the core technologies are generating all possible manufacturing process chains by combining all core technologies of one process block with the core technologies of the other process blocks, and reducing all possible manufacturing process chains to a subset of possible manufacturing process chains. This reduction is based upon geometric and/or technological boundary conditions. The method includes ascertains data pertaining to per-unit costs for the component to be manufactured, . The method then selects the optimum manufacturing process chain for the component, at least on the basis of the capital value calculations and the data pertaining to risk and/or reliability.

12 Claims, 1 Drawing Sheet

METHOD FOR GENERATING PROCESS CHAINS

This application claims priority to EP 05 015 604.1, filed Jul. 19, 2005, the entire disclosure of which is hereby incorporated by reference herein.

FIELD OF THE INVENTION

The present invention relates to a method for generating a process chain, namely an optimum manufacturing process chain, for a component.

BACKGROUND

According to the related art, the engineering design of a component is established during product development in a so-called design phase, and a manufacturing process chain for the fully engineered component is subsequently generated in a production planning phase. The design phase, as well as the production planning phase are discrete processes that are carried out sequentially or one after another. To manufacture a component, related art methods provide for a manufacturing process chain made up of a plurality of successive process steps, namely manufacturing steps as well as machining steps, to be established in the production planning phase, efforts being directed to optimizing each individual manufacturing step as well as machining step and, therefore, process step. The underlying assumption here is that, by concatenating the individually optimized manufacturing steps and machining steps, overall, an optimum manufacturing process chain for the component is obtained.

The disadvantage associated with the above product development procedure known from the related art is that, by concatenating manufacturing steps, as well as machining steps that have been individually optimized in isolated processes, to produce a manufacturing process chain for a component, no comprehensive analysis is possible. In this respect, there is also no way to ensure that an optimum manufacturing process chain is found for a component to be manufactured. Another drawback associated with the related art product development procedure is that, because of the strict separation of the design phase and production planning phase, engineering designs for a component may be devised that cannot actually be manufactured or can only be manufactured at a high cost. Finally, due to the strict separation of the design phase and the production planning phase, initiatives are provided to the process development too late, so that new manufacturing processes or machining processes, which are required for manufacturing the component, are often not available in a timely manner.

BRIEF SUMMARY OF THE INVENTION

Against this background, the object of the present invention is to devise a novel method for generating a process chain, namely an optimum manufacturing process chain for a component.

According to an embodiment of the present invention, a method for generating process chains for product manufacturing is provided. In accordance with the method, all available data pertaining to the component to be manufactured is collected and the component to be manufactured is subdivided into component elements which can be manufactured independently of one another. On the basis of this subdivision, process blocks for manufacturing the component elements are defined. The method further includes collecting all possible core technologies for the individual process blocks, where the core technologies are those manufacturing processes and machining processes through which alternative manufacturing processes and machining processes differ from one another. The method includes generating all possible manufacturing process chains by combining all core technologies of one process block with the core technologies of the other process blocks, and reducing all possible manufacturing process chains to a subset of possible manufacturing process chains. This reduction is based upon geometric and/or technological boundary conditions. Particularized manufacturing process chains for this subset of manufacturing process chains are generated, with identical input states and output states being applied or being defined for all manufacturing process chains. The method ascertains data pertaining to per-unit costs for the component to be manufactured, resulting from the use of the particularized manufacturing process chains; ascertains data pertaining to the technological risk and/or to the reliability of the ascertained per-unit costs for the particularized manufacturing process chains; and performs capital value calculations for the particularized manufacturing process chains on the basis of the particular per-unit costs. The method then selects the optimum manufacturing process chain for the component, at least on the basis of the capital value calculations and the data pertaining to risk and/or reliability.

BRIEF DESCRIPTION OF THE DRAWINGS

Preferred embodiments of the present invention are derived from the dependent claims and from the following description. The present invention is described in greater detail in the following on the basis of exemplary embodiments, without being limited thereto. Reference is made to the drawing.

DETAILED DESCRIPTION

Figure 1:
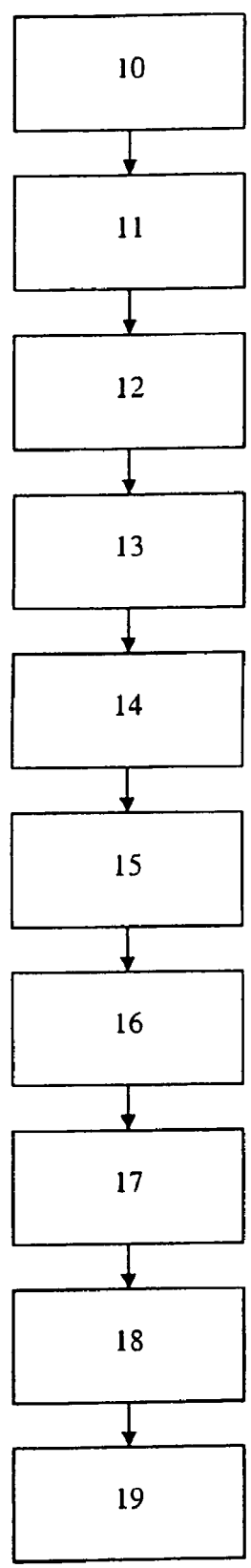
FIG. 1: shows a signal flow chart for illustrating the method according to the present invention for generating a process chain, namely an optimum manufacturing process chain for a component.

In the method according to the various embodiments of the present invention for generating a manufacturing process chain for a component to be manufactured, no manufacturing process chain is generated that is composed by concatenating individually optimized manufacturing steps and machining steps; rather, a holistically optimized manufacturing process chain is generated. This makes it possible to develop customized manufacturing process chains for components to be manufactured. By integrating the method according to the present invention in the design phase of product development, intermeshing or parallelization of the design phase and production planning phase is possible. In this way it is possible, already in the design phase, during which a major part of the later production costs is determined, to take the requirements of the production planning phase into consideration, and to develop an optimum component or product, from the standpoint of manufacturability and production costs as well. In addition, as a result of the intermeshing of the design phase and the production planning phase, it is possible, using the method according to the present invention, to generate manufacturing process chains at an early stage in a systematized, standardized and automated fashion and, at an early stage in the process, to identify gaps in the technology portfolio for manufacturing processes and machining processes.

The present invention is described in greater detail in the following with reference to the exemplary embodiment of FIG. 1.

In a first step 10 of the method according to the present invention, all available data pertaining to the component to be manufactured are acquired or collected. In this connection, inter alia, geometric data on the component to be manufactured are acquired. In addition, data relating to device engineering and process engineering are also acquired from available manufacturing processes and machining processes. In this context, the type of data acquisition depends on the stage the component to be manufactured is currently in. For example, if the component is in an early design phase, then merely rough geometric data may be acquired. In a later design phase, first work schedules, as well as component drawings, may be additionally acquired. Accordingly, in step 10 of the method according to the present invention, the actual situation is determined by collecting all available data for the component to be manufactured.

Subsequently, in a step 11, the component to be manufactured is subdivided into component elements which may be manufactured independently of one another, and process blocks are defined for manufacturing these component elements. By subdividing complex components into component elements which may be manufactured independently of one another, clearly defined and, thus, manageable subdomains are created in the manufacture of complex components.

If the intention is for an integrally bladed gas turbine rotor to be manufactured as a component, then a component element which may be manufactured, by itself or independently, may be a blade of such an integrally bladed gas turbine rotor. Accordingly, in step 11, in a substep, the component to be manufactured is subdivided into component elements which may be manufactured independently of one another; on the basis of this subdivision, process blocks are defined in another substep in order to manufacture the component elements.

In a step 12 of the method according to the present invention following step 11, all possible core technologies are determined for the process blocks of the component to be manufactured or for the component elements to be manufactured, as defined in step 11. The core technologies are those manufacturing processes and machining processes for the individual process blocks by which alternative manufacturing processes and machining processes significantly differ from one another. When manufacturing rotor blades of an integrally bladed rotor, conventional rotary milling, troichodal tumbling milling, or broaching may be provided as possible manufacturing methods for the "primary machining" process block. If, for example, a cleaning as well as a vibratory finishing process are required in order to carry out the conventional rotary milling, troichodal tumbling milling, as well as broaching processes, then the cleaning as well as vibratory finishing processes are not considered as core technologies. Rather, only the rotary milling, tumbling milling and broaching processes are determined, as such, to be core technologies.

Subsequently, in step 13 of the method according to the present invention, all possible manufacturing process chains for a component to be manufactured are generated by combining all core technologies of a process block with the core technologies of the process blocks that follow in the direction of production. By combining all core technologies of all process blocks arranged in the direction of production, a plurality of possible manufacturing process chains is derived, step 13 being implemented as a purely combinatorial step. In this connection, geometric limits or also technological limits for the manufacturability of the component to be manufactured are left out of consideration. In step 13 of the method according to the present invention, the largest possible number of alternative manufacturing process chains is identified by combining all core technologies of all process blocks with one another.

In a subsequent step 14 of the method according to the present invention, a subset of possible manufacturing process chains is filtered out of the plurality of all possible manufacturing process chains ascertained in step 13, taking into consideration geometric and/or technological boundary conditions. Accordingly, in step 14, the manufacturing process chains generated in step 13 are reduced to a subset. In this connection, the geometric boundary conditions are derived from the geometric data of the component acquired in step 10. The technological boundary conditions are derived from the collected data relating to device engineering, as well as process engineering of the available manufacturing or machining processes, as well as manufacturing or machining equipment. Accordingly, geometric as well as technological boundary conditions play a decisive role in reducing the manufacturing process chains, in the process, it being assessed to determine to what extent component specifications may be achieved using the possible manufacturing process chains. Accordingly, component specifications or geometric data of the components are of decisive importance in reducing the manufacturing process chains in step 14.

In a subsequent step 15 of the method according to the present invention, particularized manufacturing process chains are then generated for the subset of the manufacturing process chains ascertained in step 14.

The goal that one strives to achieve when carrying out the particularization is for the manufacturing process chains of the identified subset of all possible manufacturing process chains still on a relatively raw level to be comparable among themselves. To this end, identical input states and output states are identified in step 15 for all manufacturing process chains of the subset defined in step 14. Using the input state as a point of departure, all manufacturing process chains are supplemented by manufacturing steps as well as machining steps until the identical output state is reached for all manufacturing process chains of the subset. In this connection, the main focus, in turn, is on those manufacturing steps or machining steps or manufacturing processes, as well as machining processes that do not occur in all manufacturing process chains.

The level of particularization to be effected in step 15 for the manufacturing process chains of the subset identified in step 14 may vary greatly, efforts being directed, however, to achieving a greatest possible particularization for all manufacturing process chains. In this context, it must be considered that individual process steps or manufacturing steps and machining steps of the particularized manufacturing process chains are not arbitrarily mutually exchangeable, since individual manufacturing steps as well as machining steps of one entire manufacturing process chain may be differentiated very effectively from one another by both their input states and output states.

Subsequently to step 15, data pertaining to per-unit costs in the manufacture of the component derived using the particularized manufacturing process chains are ascertained in a step 16 of the method according to the present invention. The process chains are evaluated with respect to the per-unit costs to be expected on the basis of the particularization thereof undertaken in step 15. To this end, the process times required for the particularized manufacturing process chains are determined per process step and thus manufacturing step or machining step, the particular per-unit costs for the particularized manufacturing process chains being calculated on the basis of labor costs, machine costs, and material costs. The process times of the individual manufacturing steps as well as the machining steps of the particularized manufacturing process chains may be determined either by estimating or calculating the same.

From the process times, it is possible to calculate machine hour rates, labor and material costs for each process step in a simple manner for per-unit costs to be expected for each particularized manufacturing process chain.

In a subsequent step 17 of the method according to the present invention, data pertaining to the technological risk of the particularized manufacturing process chains as well as to the accuracy of the ascertained per-unit costs for the particularized manufacturing process chains are determined.

When ascertaining the technological risk of the particularized manufacturing process chains, a technological overall risk $R_{OVERALL}$ is ascertained for each of the particularized manufacturing process chains, this technological overall risk being determined from the risk values $R_{STEP-1}$ of the individual process steps of the particularized manufacturing process chains. Accordingly, risk values $R_{STEP-1}$ are ascertained for each manufacturing process as well as machining process of a process step I and thus for each manufacturing step and machining step, the risk values being dependent on the particular development stage of the manufacturing processes or machining processes. For this purpose, the following table may be used.

| Technology maturation stage | Risk value |
|---|---|
| Maturity phase | 0% |
| Transition phase | 3% |
| Test phase | 5% |
| Draft phase | 8% |
| Design phase | 13% |
| Definition phase | 18% |
| Pre-phase | 20% |

Therefore, if it is a question, for example, of a production-ready manufacturing and machining process, then the risk value is 0%. If the manufacturing or processing method is only in the design phase, then the risk value is 13%, for example. If the manufacturing process or machining process is already in the testing phase, then a risk value of 5% may be assigned thereto, for example.

In addition to evaluating the technology maturation stage when ascertaining the risk values for the process steps, it may additionally be taken into account whether it is a question of processes that are available in-house or to be acquired from an outside company. As a function thereof, the risk values ascertained on the basis of the technology maturation stage may be provided with a risk surcharge. For this purpose, the following table may be used.

| Technology availability | Risk surcharge |
|---|---|
| In-house | 0% |
| Cooperation partner | 5% |
| Outside company | 10% |

For processes that are available in-house, the risk surcharge is 0%. If it is a question of outside technologies to be additionally acquired, then, for example, a risk surcharge of 10% may be added to the risk value ascertained on the basis of the technology maturation stage. If it is a question of technologies of cooperation partners, then, for example, a risk surcharge of 5% may be added to the risk value ascertained on the basis of the technology maturation stage.

Once risk values $R_{STEP-1}$ of all process steps I of the detailed manufacturing process chains have been defined or ascertained as a sum of risk value and risk surcharge, the overall technological risk $R_{OVERALL}$ of a particularized manufacturing process chain is calculated using the following formula:

$$R_{OVERALL} = (1 - ((1 - R_{STEP-1}) * (1 - R_{STEP-2}) * \ldots * (1 - R_{STEP-N}))),$$

where $R_{OVERALL}$ is the overall technological risk of a particularized manufacturing process chain, $R_{STEP-1}$ is the risk value of process step I of this particularized manufacturing process chain, and N is the number of process steps.

As mentioned previously, in step 17, for each particularized manufacturing process chain, the reliability of the ascertained per-unit costs is also ascertained, which is also described as "level of confidence" or LOC. In this connection, for each particularized manufacturing process chain, an overall reliability $LOC_{OVERALL}$ of the per-unit costs ascertained for the particularized manufacturing process chain in question is determined.

The overall reliability $LOC_{OVERALL}$ is composed of reliability values $LOC_{STEP-1}$ of the data of individual process steps I of the particularized manufacturing process chain in question. To ascertain reliability values $LOC_{STEP-1}$ of the individual process steps I, the following table may be used.

| Data type | Reliability value/LOC |
|---|---|
| Validated data | 100% |
| Calculated data, empirically yes | 95% |
| Estimated value, empirically yes | 93% |
| Calculated data, empirically no | 90% |
| Estimated value, empirically no | 85% |

On the basis of per-unit costs ascertained using validated data, a reliability value of 100% is then assigned. A reliability value of 93% is ascertained, for example, on the basis of per-unit costs ascertained using empirically based estimated value data, whereas per-unit costs ascertained on the basis of theoretical estimated value data are assigned a reliability value of 85%, for example.

From these reliability values of individual process steps I, overall reliability value $LOC_{OVERALL}$ of each particularized manufacturing process chain is then calculated using the following formula:

$$LOC_{OVERALL} = LOC_{STEP-1} * LOC_{STEP-2} * \ldots * LOC_{STEP-N},$$

where $LOC_{OVERALL}$ is the overall reliability of a particularized manufacturing process chain, $LOC_{STEP-1}$ is the reliability value of process step I of this particularized manufacturing process chain, and N is the number of process steps.

Following step 17, capital value calculations for the particularized manufacturing process chains are carried out in a step 18 of the method according to the present invention. Using such a capital value calculation for the particularized manufacturing process chains, aspects such as different investments, machine scheduling times, capacity utilizations, as well as the different amounts of required operating resources may be determined and taken into account. In the capital value calculation, each particularized manufacturing process chain is considered as an independent investment, which is characterized by incoming and outgoing cash flows, referred to as incoming payments and disbursements.

Thus, for example, the expected sales or sales proceeds of the components to be manufactured are handled as incoming payments. Essential non-recurring costs for component testing and per-unit costs are handled as disbursements. In this context, incoming payments and disbursements are differentiated in time sequence by amount, time of accrual, and duration, so that annual fluctuations resulting from changing sales may be represented, for example. Accordingly, in the capital value method, time factors are considered, since incoming payments, which lie ahead, are worth less than those that are near-term. Accordingly, all incoming payments and disbursements are discounted for the present point in time, an incoming payment or disbursement discounted for the present point in time also being described as present cash value.

The capital value of a manufacturing process chain is expressed as the difference between the sum of the present cash values of all incoming payments and the sum of the cash values of all disbursements on the basis of the following formula:

$$K = \sum_{t=0}^{n} (E_t - A_t)(1 + i)^{-t},$$

where K is the capital value, $E_t$ is an incoming payment at the end of period t, $A_t$ is a disbursement at the end of period t, i is the calculatory interest rate, and n is the useful life of an investment object.

Discounting is calculated using a calculatory interest rate which corresponds to the intended minimum interest yield. It is presumed here that incoming payments yield interest at the calculatory interest rate. If the capital value is zero, then this minimum interest yield is just about achieved, i.e., the surplusses of incoming payments are sufficient to cover the initial disbursements and to pay interest on the invested capital at the calculatory interest rate. If the capital value is positive, it shows the payment surpluses of the investment object which are available after deduction of the acquisition disbursement and may accrue interest. Moreover, a positive capital value indicates that an interest yield exists which is above the calculatory interest rate. The opposite is true in the event of a negative capital value. According to the capital value method, an investment is the more advantageous the higher the capital value. Basically, a manufacturing process chain is the more advantageous the higher its capital value turns out to be.

In step 18 of the method according to the present invention, no absolute capital value is ascertained for the manufacturing process chains, rather, differential capital values are ascertained for a jump basis AB which is used as a basis for comparison. This makes it possible to save a labor-intensive data collection with regard to sales, achieved sales proceeds, per-unit costs, and the like. If such differential capital values are plotted in a diagram, then the jump basis receives the value zero. However, this does not mean that the jump basis is uneconomical. A differential capital value of a manufacturing process chain results when the following formula is taken as a basis:

$$\Delta K = \sum_{t=0}^{n} ((HK_{AB} - HK)_t + (AS - AS_{AB})_t + (AI_{AB} - AI)_t + (EK_{AB} - EK)_t)$$

-continued $$(1 + i)^{-t},$$

where ΔK is the differential capital value, HK are the manufacturing costs, AS are the depreciations, AI are the capital investments, and EK are the non-recurring costs.

In a step 19 of the method according to the present invention, following step 18, the optimum manufacturing process chain for a component to be manufactured is selected, namely on the basis of the capital value calculation carried out in step 18 and on the basis of the risk data of the particularized manufacturing process chains ascertained in step 17. In a diagram, the capital value or the differential capital value is preferably plotted against the risk value; in the case of a comparable risk value, the very manufacturing process chain is selected which shows the highest capital value. A manufacturing process chain is thus only selected when there is no other manufacturing process chain having at least the same capital value with lower risk.

It should be pointed out that within the scope of generating an optimum manufacturing process chain for a component according to the present invention, technologies or core technologies which are not yet ready for mass production may also be taken into account. For bridging the time between production start and availability for mass production of the respective technology, alternative production scenarios are established within the scope of the present invention which employ technologies which are ready for mass production. Starting with the availability of the respective technology for mass production, one may then switch to another manufacturing process chain.

This makes it possible by way of a holistic approach to generate an optimum manufacturing process chain for a component to be manufactured.

What is claimed is:

1. A method for generating a manufacturing process chain for a component, comprising:
   (a) collecting all available data pertaining to a component to be manufactured;
   (b) subdividing the component to be manufactured into component elements which can be manufactured independently of one another and defining process blocks for manufacturing the component elements;
   (c) collecting all possible core technologies for the individual process blocks, wherein the core technologies are those manufacturing processes and machining processes through which alternative manufacturing processes and machining processes differ from one another;
   (d) generating all possible manufacturing process chains by combining all core technologies of one process block with the core technologies of the other process blocks;
   (e) reducing all possible manufacturing process chains to a subset of possible manufacturing process chains based upon geometric and/or technological boundary conditions;
   (f) generating particularized manufacturing process chains for this subset of manufacturing process chains, wherein all of said manufacturing process chains have identical input states and identical;
   (g) ascertaining data pertaining to per-unit costs for the component to be manufactured, resulting from the use of the particularized manufacturing process chains;

(h) ascertaining data pertaining to the technological risk and/or to the reliability of the ascertained per-unit costs for the particularized manufacturing process chains;

(i) performing capital value calculations for the particularized manufacturing process chains on the basis of the particular per-unit costs;

(j) selecting the optimum manufacturing process chain for the component, at least on the basis of the capital value calculations and the data pertaining to risk and/or reliability.

2. The method as recited in claim 1, wherein component geometry data of the component to be manufactured are collected in step (a).

3. The method as recited in claim 1, wherein device-engineering and/or process-engineering data for available manufacturing processes and machining processes are collected in step (a).

4. The method as recited in claim 2, wherein the geometrical boundary conditions for step (e) are derived from the component geometry data collected in step (a).

5. The method as recited in claim 3, wherein the technological boundary conditions for step (e) are derived from the device-engineering and/or process-engineering data collected in step (a).

6. The method as recited in claim 1, wherein the per-unit costs are ascertained in step (g) from the process times and/or materials and/or devices resulting for the particularized manufacturing process chains.

7. The method as recited in claim 1, wherein the step of ascetaining the technological risk in step (h) further comprises determining, for each of the particularized manufacturing process chains, an overall technological risk $R_{OVERALL}$ based upon risk values $R_{STEP-1}$ for all manufacturing steps and machining steps of said each manufacturing process chain, the risk values being based on the development stage and/or the availability of the appropriate core technology.

8. The method as recited in claim 7, the step of ascetaining the technological risk in step (h) further comprises calculating the overall technological risk $R_{OVERALL}$ based on the risk values $R_{STEP-1}$ using the formula: $R_{OVERALL}=(1-((1-R_{STEP-1})*(1-R_{STEP-2})*\ldots*(1-R_{STEP-N}))$.

9. The method as recited in claim 1, the step of ascetaining the reliability in step (h) further comprises calculating, for each of the particularized manufacturing process chains, an overall reliability $LOC_{OVERALL}$ of the ascertained per-unit costs of said each particularized manufacturing process chain based upon a determination of reliability values $LOC_{STEP-1}$ of the appropriate data for all manufacturing steps and machining steps of said each particularized manufacturing process chain.

10. The method as recited in claim 9, wherein the overall reliability $LOC_{OVERALL}$ is calculated from the reliability values $LOC_{STEP-1}$ based upon the formula: $LOC_{OVERALL}=LOC_{STEP-1}*LOC_{STEP-2}*\ldots*LOC_{STEP-N}$.

11. The method as recited in claim 1, wherein the step of performing capital value calculations of step (i) further comprises performing a differential capital value calculation.

12. The method as recited in claim 1, wherein, in step (j), the manufacturing process chain having the highest capital value with the lowest risk is selected as the optimum manufacturing process chain.

* * * * *